Patented Feb. 1, 1949

2,460,795

UNITED STATES PATENT OFFICE 2,460,795

METHOD FOR MAKING RUBBERY POLYMERIC ORGANO-SILOXANE COMPOSITIONS

Earl Leathen Warrick, Pittsburgh, Pa., assignor to Corning Glass Works, Corning, N. Y., a corporation of New York No Drawing. Application October 3, 1944, Serial No. 557,056

2 Claims. (Cl. 260—37)

This invention relates to new compositions of matter and methods of making them, and, more particularly, to organo-siloxanes, methods of treating them and the product thereof.

There has long been a demand commercially for a mechanically strong and elastic material which is adapted to maintain its properties at temperatures up to 200° C. and above. Such a material is needed in washers, gaskets, flexible connecting tubes, etc., which are exposed to high temperatures for either short or long periods of time, as in motors, engines and many other applications. The rubbers, natural and synthetic, which are now known, rapidly lose their desirable properties upon exposure to temperatures above 150° C. For example, natural latex rubber loses 80 per cent of its tensile strength when heated above 140° C.

The primary object of the present invention is to provide a mechanically strong, compressible and resilient material which will retain its physical properties at temperatures as high as 200° C. and above for prolonged periods of time.

Other objects and advantages will be apparent from the following description.

In my copending application Serial Number 557,055, entitled "Polymerization of organo-siloxanes," filed on even date herewith and assigned to the assignee of the present invention, it was shown that any organo-siloxane which contained alkyl radicals attached directly to silicon could be polymerized by treatment with an aromatic acyl peroxide such as benzoyl peroxide. By such treatment, low viscosity liquids could be converted to high viscosity liquids and, if the treatment were continued long enough, solids or gels could be obtained. All of such products were found to be useful for one purpose or another, such as damping fluids, waterproofing agents or as solid electrically insulating coatings for metallic conductors or glass fabrics, etc. However, as pointed out in that application, a group of products was obtained from the treatment of a particular class of organo-siloxanes, with an aromatic acyl-peroxide, which possessed properties quite distinct from those of the other products in general. These properties were unusual compressibility and resiliency as well as high heat resistance and excellent electrical characteristics. It is to these products and methods of making them that the present application is specifically directed.

In accordance with my invention, I have discovered that compressible and resilient molded products of high heat stability can be prepared by treating organo-polysiloxanes whose organic substituents consist essentially of monovalent organic radicals attached to silicon through carbon-silicon linkage, there being on the average between 1.75 and 2.25 of said organic radicals per silicon atom, and there being present in said polysiloxane at least 40 mol per cent diorgano-substituted silicon oxide units of the formula RR'SiO where R and R' are alkyl radicals, with an acyl peroxide containing at least one aromatic acyl radical under reacting conditions until a rubbery solid is obtained.

The preferred method of preparing the products of my invention comprises broadly three steps. In the first step, a low molecular weight organo-siloxane fulfilling the above requirements as to composition and being, in general, a liquid of low viscosity, is polymerized to a high molecular weight composition which exhibits little or no flow at room temperature. This composition may be an extremely viscous liquid, a gel or even a solid. The polymerization to the high molecular weight stage may be accomplished by any suitable method as by the use of a dehydrating agent if the siloxane is incompletely condensed or by treatment with a strong acid or strong alkali if the siloxane contains completely condensed polymers. Another method of polymerization that may be used is that which comprises blowing air through the siloxane at elevated temperatures until an extremely viscous liquid or gel is obtained.

A still further method of polymerization involves the use of an aromatic acyl peroxide such as benzoyl peroxide as described in the above mentioned copending application. In this method the siloxane is treated with an aromatic acyl peroxide at reaction temperature to produce an increase in viscosity. The reaction temperature is in the neighborhood of the decomposition temperature of the peroxide or above. If the treatment is continued long enough and the siloxane has the composition given above, a gel will result which is suitable for use in the next step of this process. It is preferable but not absolutely essential that the treatment with the peroxide be carried out in the absence of oxygen, since the latter appears to reduce the effectiveness of the peroxide, particularly at the surface of the treated liquid siloxane.

The second step of my preferred method comprises thoroughly mixing the high molecular weight composition obtained as a result of the first step with a minor proportion of an aromatic acyl peroxide, perferably from 2 to 6 per cent by weight. The resulting mixture is a workable and moldable composition capable of being formed into any shape. If desired, a filler my be incorporated into the mixture in this step in order to modify and improve the properties of the molding composition for specific applications and uses The third step comprises placing the molding composition from step two in a mold from which oxygen is preferably excluded and then heating until a non-tacky solid rubbery molded product is obtained. I have found that oxygen reduces the effectiveness of the peroxide as a molding agent and in many instances inhibits the formation of a non-tacky surface on the molded product. In general, it is sufficient to employ an air-tight mold. But in some applications it may not be necessary to use a mold which is completely closed, in which case oxygen may be excluded by use of reduced pressure or an inert atmosphere such as carbon dioxide. The temperature at which this molding or "curing" step is carried out is again preferably in the neighborhood of the decomposition temperature of the peroxide, which for benzyl peroxide is above 100° C. In general, a curing temperature between 125 and 200° C. is used.

The above preferred method may be modified, if desired, where a filler is to be incorporated into the molding composition. In such cases, it is not necessary to use a material which by itself exhibits little or no flow as indicated above. A more fluid siloxane may be used if, when intimately mixed with sufficient filler and peroxide, a composition is obtained of such consistency that it is capable of being handled in a mold. Where such a relatively low viscosity or low molecular weight liquid siloxane is used, it is necessary to add more peroxide in order to polymerize the liquid to the desired rubbery condition, as will be readily understood. The conversion from the liquid to the rubbery state may then be effected in one operation by simply heating the resulting mixture at reaction temperature.

A further modification where a filler is employed involves the incorporation of the filler in the initial liquid siloxane of step one with only sufficient peroxide to convert the liquid to the gel stage. When the latter is reached as a result of heating, more peroxide is added as described in step two. The remaining treatment is the same as given in the preferred method. The advantage derived from adding the filler in step one is better dispersion of the filler resulting in a more uniform, bubble-free product.

The product obtained from the above processes are flexible, compressible and resilient materials of high heat stability. These products can withstand temperatures up to 250° C. for over 100 hours and temperatures as high as 350° C. for over 20 hours. Their tensile strength is relatively low, but may be greatly increased if a heat resistant inert filler such as glass, alumina, titana, zinc oxide, etc., is incorporated into the mixture of peroxide and siloxane prior to molding.

The organo-polysiloxanes (commonly called "silicones"), which are used in preparing the above products, are compositions comprising essentially silicon atoms connected to each other by oxygen atoms through silicon-oxygen linkages, thus,

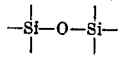

and having on the average 1.75 to 2.25 monovalent organic radicals attached through carbon-silicon linkages to each silicon atom. They must comprise the recurring structural unit which corresponds to the empirical formula RR'SiO where R and R' are alkyl radicals. Preferably, the number of units of this formula present in the siloxane is at least 40 per cent of the total number of silicon units in the siloxane. By silicon unit is meant any unit which corresponds to one of the following empirical formulae, $SiO_2$, $RSiO_{3/2}$, $R_2SiO$, and $R_3SiO_{1/2}$, where R is a monovalent organic radical attached to silicon through carbon-silicon linkage. These organo-polysiloxanes may be prepared by hydrolyzing a hydrolyzable diorganosilane followed by condensation (partial or complete) of the hydrolysis product. They may also be prepared by hydrolyzing and condensing mixtures of different hydrolyzable organo-monosilanes containing at least 40 mol per cent of a hydrolyzable di-alkyl-silane, as described in the copending application of James Franklin Hyde, Serial Number 432,528, filed February 26, 1942, and assigned to the assignee of the present invention. In the latter case, hydrolyzable silanes which contain no organic radicals attached to silicon through carbon-silicon linkages, such as silicon tetrachloride or ethyl orthosilicate, may be included with the organo-silanes, if desired. By employing such mixtures of silanes, in the proper proportions, it is possible to prepare organo-siloxanes which contain on the average between 1.75 and 2.25 organic radicals per silicon atom. It is to be understood that the siloxanes may contain some uncondensed hydroxyl groups as well as some residual unhydrolyzed hydrolyzable radicals.

By hydrolyzable organo-silanes, I mean derivatives of $SiH_4$, which have the general formula $R_ySiX_{(4-y)}$, where R represents an organic radical attached to silicon through carbon-silicon linkages; X represents a readily hydrolyzable radical selected from the class consisting of halogens, amino groups, alkoxy, aroxy and acyloxy radicals; and $y$ is an integer from 1 to 3. Examples of organic radicals represented by the symbol R are as follows: aliphatic radicals such as methyl, ethyl, propyl, isopropyl, butyl, amyl, hexyl, heptyl to octadecyl and higher; alicyclic radicals such as cyclopentyl, cyclohexyl, etc., aryl and alkaryl radicals such as phenyl, mono- and poly-alkyl phenyl as tolyl, xylyl, mesityl, mono-, di-, and tri-ethyl phenyls, mono-, di-, and tri-propyl phenyls, etc.; naphthyl, mono- and poly-alkyl naphthyls as methyl naphthyl, diethyl naphthyls, tri-propyl naphthyl, etc.; tetra-hydro-naphthyl, anthracyl, etc.; aralkyl such as benzyl, phenyl-ethyl, etc.; alkenyl such as methallyl, allyl, etc., and heterocyclic radicals. The above organic radicals may also, if desired, contain inorganic substituents such as halogens, etc.

In general, I have found any acyl peroxide containing at least one aromatic acyl radical to be effective in the preparation of the products of my invention. Examples of such peroxides are benzoyl peroxide, benzoyl acetyl peroxide, dinaphthyl peroxide, benzoyl lauroyl peroxide, etc. The acyl radical may contain inorganic substituents such as halogens, nitro groups, etc.

The mechanism of the reaction between the alkyl siloxanes and acyl peroxide is not clearly understood. In the case of benzoyl peroxide, benzoic acid is a by-product of the reaction. The reason for oxygen impairing the effectiveness of the peroxide is likewise not known. Whatever the particular mechanism is, it is clear that the peroxide causes molecules of the siloxane to link together to produce molecules of higher molecular weight and greater viscosity.

For a better understanding of my invention reference should be had to the following examples.

EXAMPLE 1

In this example the organo-siloxane was polymerized to a high molecular weight gel by means of benzoyl peroxide. However, so far as this part of the process is concerned, other polymerization agents could have been used as mentioned above.

Liquid dimethyl silicone having a viscosity of 1,000 centistokes was prepared by refluxing a mixture of two volumes of dimethyldiethoxysilane, one volume of 95% ethyl alcohol and one volume of aqueous hydrochloric acid for four hours, washing the product, drying the oily liquid formed and then distilling up to 250° C. at 0.5 mm. to remove low polymers. The undistilled portion of the liquid was then thoroughly mixed with about three per cent by weight of benzoyl peroxide in the form of "Luperco A" which contains about 23% benzoyl peroxide precipitated on calcium sulfate. I prefer to use the peroxide mixed with calcium sulfate because of the great reactivity of the pure peroxide. The calcium sulfate in no way interferes with the production of the materials of my invention. The resulting mixture was heated at 150° C. for two hours whereupon a gel was formed which was quite elastic and tacky and which was insoluble in benzene. This gel was then milled with about 25 parts by weight of alkali-free asbestos per 100 parts of gel and three parts by weight of benzoyl peroxide. The product had the consistency of dough. It was then poured into a mold from which oxygen was excluded. The mold and contents were heated in an oven for about a half hour at 150° C. At the end of this time the contents of the mold had set to a non-tacky coherent rubbery solid.

In the above process, I have found that the amount of benzoyl peroxide initially added to the liquid dimethyl silicone can be varied. In general, the larger the amount of peroxide used, the stiffer the gel obtained and the harder the ultimate molded product is.

In the amount of benzoyl peroxide used initially is less than 1%, a gel is obtained which is very tacky. When this extremely tacky gel is mixed with 4-6% of benzoyl peroxide and a filler and then heated at 150° C. for about a half hour in a mold, a permanent "foam" rubber results of high heat resistance. A space should be left in the mold to permit expansion of the siloxane while at the same time oxygen is preferably excluded to facilitate rapid and complete curing. The mold should be allowed to cool before removing the molded product in order to give any gases entrapped in the cells of the rubbery siloxane an opportunity to escape. This cellular molded product is compressible, resilient and retains its properties even when held at temperatures above 200° C. for many hours. For example, a sample with 33% iron oxide held at 250° C. for 22 hours lost only 9.5% weight and changed only 3.3 per cent in dimension and decreased only 4% in compressibility or hardness.

The same cellular product, or "foam" rubber, may also be obtained by starting with a fairly fluid polysiloxane, mixing it with peroxide and filler, and then proceeding as above outlined. The requisite conditions for the formation of such "foam" rubber, are the rapid reaction of a mixture of peroxide and either a liquid siloxane or a very tacky gel within a space from which oxygen is excluded and which is of sufficient size to permit rapid expansion of the reaction product.

The time required to convert the initial liquid dimethyl silicone to a gel depends upon the amount of peroxide used, the viscosity of the starting silicone which is preferably 1000 centistokes or above, and upon the temperature which is preferably above 100° C. In some cases 17 hours were required to reach a stage of gelatin.

EXAMPLE 2

A low viscosity liquid diethyl silicone was prepared by hydrolyzing diethylsilicon dichloride. It was thoroughly mixed with 2% of benzoyl acetyl peroxide and then heated at 150° C. for 17 hours, the resultant product being a tacky gel. The latter was milled with an equal weight of fiber glass flock (⅛ inch) and an additional 6% by weight of peroxide. The mixture was then heated in a mold from which air was excluded at 150° C. for one hour. The molded product resembled that obtained in Example 1, having a stretch of 125% and a hardness of 42 as measured on a Shore durometer.

EXAMPLE 3

To a 2000 centistokes dimethyl silicone fluid was added 6% of Luperco A based on the weight of the fluid. The dimethyl silicone was placed in a jacketed Baker-Perkins dough mixer and the powdered "Luperco A" added through a 100 mesh screen with the mixer running and at room temperature. The cover was placed on and the mixer evacuated to about 0.5 inch pressure. Then 60 pound steam was admitted to the jacket. The contents were mixed for 30 minutes and then cooled. The product at this stage was a soft oily rubbery gel, gray in color and translucent in thin sections.

To each 100 parts of the gel in the mixer was then added 62 parts of finely divided calcium carbonate and 20 parts more of Luperco A. Mixing was continued at room temperature for 30 minutes. The resultant mixture was then removed and malaxated on a two roll rubber compounding mill at room temperature to insure homogeneity. The product at this stage is a greyish white rubbery crepe, nonadherent to itself and very weak.

The above "crepe" material was then used to mold flat sheets or rubberlike cable insulation as follows:

A. *Molding flat sheets.*—The "crepe" was filled into a cold mold in a compression molding press and held under 500 lbs./sq. in. at 150 lbs. steam pressure on the platens (165° C. on the mold) for 1 hour. The press was cooled to room temperature before releasing the pressure. The molded piece was heated in an air oven at 100° C. for 16 hours to improve its toughness. A dumbbell-shaped test piece measuring ¼" wide and ⅛" thick at the narrow section gave a tensile strength of 80 lbs./sq. in., an elongation of 160% and showed an elastic recovery of 98% of the original.

B. *Molding wire insulation.*—A length of motor lead copper wire was wrapped roughly with the "crepe" described above and the wire stretched taut in a centering device in a flash mold. The mold was locked together and placed in an air oven at 175° C. for one hour. The mold was then removed from the oven and allowed to cool.

A uniform resilient greyish-white rubberlike insulated wire resulted. The Shore Durometer hardness was 28 on the "A" scale. On baking 16 hours at 100° C., its toughness and hardness improved considerably, and it withstood 40 hours at 250° C. without appreciable dimensional change and only 5% weight loss. The hardness on the Shore "A" scale went up to 39. After a total of 48 hours at 250° C. the sample was found to have the following electrical properties:

|  | 1000 Cycles | 1 Megacycle |
|---|---|---|
| Dielectric Constant | 3.83 | 3.65 |
| Power Factor........percent.. | 0.12 | .48 |

The siloxane rubber was found to be tightly bonded to the copper conductor and to be exceptionally resistant to tracking, oil, water and gasoline.

Similarly other fillers than calcium carbonate were used following the same general procedure with the results shown in Table 1. In item 1 are given the percentages of Luperco A used to polymerize the 2000 cs. dimethyl silicone fluid to a gel. In item 2 are given the parts of filler added to the gel; and in item 3 are given the additional parts of Luperco A mixed with the gel. The remaining items are believed to be self-explanatory.

Table I

|  |  | Acid Washed Asbestos | Iron Oxide | Glass Fiber Flock (1/8") |
|---|---|---|---|---|
| 1 | Luperco A | 8.7 | 8.7 | 3.9 |
| 2 | Parts Filler per 100 parts of gel. | 60 | 150 | 150 |
| 3 | Parts Luperco A per 100 parts of gel. | 20 | 20 | 20 |
| 4 | Molding Conditions: | | | |
|  | Time, hours | 1 | 1 | 1 |
|  | Temp. ° C | 175 | 175 | 175 |
|  | Pressure, lbs./sq. in. | 1,000 | 1,000 | 1,000 |
| 5 | Heat Stability, Shore Durometer: | | | |
|  | As molded | 49 | 42 | 62 |
|  | 24 hours at 250° C | 62 | 77 | 87 |
|  | 48 hours at 250° C | 68 | 84 | 94 |
| 6 | Heat Stability, per cent Weight Loss: | | | |
|  | 24 hours at 250° C | 6 | 6 | 7 |
|  | 48 hours at 250° C | 7 | 6 | 12 |
| 7 | Tensile Strength, lbs./sq. in. | 100 | 47 | 173 |
| 8 | Elongation, percent | 50 | 75 | 55 |
| 9 | Elastic recovery, percent | 99 | 98 | 98 |

EXAMPLE 4

To each 100 parts of 7600 centipoise dimethyl silicone fluid was added 21.8 parts of Luperco A and 60 parts of Mapico Brown (iron oxide). The mixture was blended at room temperature by four passages through a three roll rubber compounding mill. A very soft tacky reddish-brown product, which I shall designate "A," resulted. Five discs, each three inches in diameter, were cut from heat-cleaned fiber glass cloth. The sticky product was then applied to the fiber glass discs by means of a hand roller. These impregnated discs were then alternated with layers of greyish white rubbery crepe which I shall designate "B," prepared as in th preceding example, using calcium carbonate as a filler. The composite tier approximated 10 parts by weight of "A," 7 parts by weight of fiber glass cloth and 78 parts of "B." The laminated mold was then placed in a compression molding press under 1000 pounds per square inch at 170° C. for one hour.

The laminated product was an excellent material for gaskets.

The above examples illustrate the various methods by which my new molding compositions and molded products may be made. Similar compositions and products with and without fillers were produced from other organo-siloxanes than those employed as illustrations in the examples. Included in these was a chlorinated dimethyl silicone containing 9.75% chlorine which when treated by the procedure outlined in Example 1 yielded a non-tacky, rubbery product having a stretch of 140% and a Shore Hardness of 41. The same procedure was used to make a rubbery product from a methyl siloxane containing 45 parts monomethyl silicon units, 50 parts dimethyl silicon units and 5 parts trimethyl silicon units. The product had a Shore Hardness of 50. Similar rubbery products were obtained by mixing liquid dimethyl silicones having viscosities of $10^4$ and $10^6$ centistokes respectively with fillers and benzoyl acetyl peroxide followed by heating at 150° C. for 60 minutes. A copolymeric organo-siloxane containing principally dimethyl silicon units with the remainder being essentially phenyl ethyl silicon units gave an elastic rubbery product of high heat stability when subjected to the procedure of Example 1.

In the above examples, the molding compositions were made from siloxanes which were in the form of gels. Although the gels are more convenient to handle for most applications, it is not absolutely essential that the siloxanes be in that form. As pointed out previously, they may be liquids or even solids. If liquid, the only requirement is that they be sufficiently viscous to handle in molding operations. And if fillers are used, the liquids may be quite fluid in character since the filler, if present in sufficient amount, can hold the liquid as a pasty mass. If the siloxanes are solids, then they may be pulverized and mixed with the peroxide and, if desired, with a filler. The resulting powder is then adapted to be used as a molding composition in the same manner as described above.

The use of a filler in the molding compositions of my invention is desirable in many instances in order to improve and modify the properties of the final molded product. Among the fillers I have used are the following: asbestos, clay 188, "silene" (hydrated calcium silicate), zinc sulfide, silica aerogel, Buca clay, barium titanate, Fiberglas floc, iron oxide, Wyoming bentonite, Lithopone, zinc oxide, titania, magnesia, micronized graphite, micronized slate, micronized mica, celite, calcine T, $PbO_2$, PbO, blue lead, dehydrated alumina and hydrated alumina. In general, I prefer to use heat resistant inorganic materials melting above 350° C., such as silicates, polyvalent metal oxides, etc. The particular filler selected depends upon the specific property, or properties, desired. If strength, toughness and high stretch are desired, zinc oxide, titanium oxide and hydrated aluminum oxide are the best. If small weight loss and slight dimensional change after long exposure to elevated temperatures are required of the molded product, asbestos is an excellent filler. If an elastic cellular product is desired, non-fibrous fillers such as hydrated alumina and iron oxide in combination with an aromatic acyl peroxide and an organo-siloxane of the previously specified composition will yield "foam rubber" products of high heat resistance. When fast setting time is desired, iron oxide is the best filler.

The following table shows the effect of various fillers upon the heat stability of dimethyl siloxane products of my invention. Samples of the molded product were heated successively at three temperatures: 250° C. for 22 hours; 300° C. for 25 hours; and 350° C. for 20 hours. The weight losses and shrinkage changes were calculated as the total per cent change from the initial property.

*Table II*

[Total Percent Change in Properties]

| Filler | Weight Percent Filler | Weight | | | Dimension | | |
|---|---|---|---|---|---|---|---|
| | | 250° | 300° | 350° | 250° | 300° | 350° |
| Silene | 30 | 6.5 | 41.0 | 58.6 | 3.0 | 11.5 | 12.0 |
| Aerogel | 20 | 17.5 | 47.0 | 62.1 | 5.5 | 11.0 | 11.8 |
| Clay 188 | 50 | 26.0 | 44.0 | 45.4 | 6.3 | 7.5 | 9.5 |
| Buca Clay | 50 | 13.0 | 28.5 | 40.4 | 6.0 | 6.0 | 9.05 |
| Asbestos | 33 | 4.5 | 10.0 | 29.2 | 1.5 | 1.5 | 6.1 |
| Iron Oxide | 33 | 9.5 | 44.5 | 63.8 | 3.3 | 23.0 | 30.2 |

The amount of filler which can be tolerated in the molded products also depends upon the particular specific properties desired. The amount likewise varies from filler to filler since each filler has properties peculiar to itself. In general, at least 100 parts of filler per 100 parts of siloxane may be used. In the case of iron oxide, hydrated alumina, zinc oxide, and titanium oxide, even larger amounts may be used. I have found that as high as 150 parts by weight of iron oxide may be utilized with 100 parts of the siloxane. Silene causes excessive drying of the mixture so that 25 parts by weight is about the maximum that should be used with 100 parts of siloxane. Asbestos, preferably acid washed, is one of the best fillers, because of the high heat resistance of the rubbery products made therewith. It can be incorporated in the product to the extent of 75 parts by weight thereof and 100 parts by weight of siloxane. Fiberglas is another useful filler, particularly in the form of floc. As high as 50 parts by weight may be mixed with 100 parts by weight of siloxane.

In the following table are given some physical properties of various molded products containing different fillers. These were all prepared in substantially the same manner. A dimethyl silicone liquid of 2100 centistokes viscosity was treated with 2% by weight of benzoyl peroxide as Luperco A at 125–150° C. for 17 hours to form a gel. This gel was milled with an equal amount of filler and an additional 6% benzoyl peroxide as Luperco A. The column marked "Cure 150° C." gives the minutes the molding composition was kept in the mold at 150° C.

*Table 3*

| Filler | Cure 150° C. | Stretch | Hardness, Shore | Power Factor (1 megacycle) |
|---|---|---|---|---|
| | Minutes | Percent | | |
| Fe$_2$O$_3$ | 30 | 140 | 26 | .768 |
| Fiberglas Floc | 60 | 125 | 10 | .328 |
| Al$_2$O$_3$ | 90 | 300 | 16 | .304 |
| TiO$_2$ | 60 | 300 | | 1.078 |
| ZnO | 60 | 300 | | .426 |
| MgO | 60 | 135 | | .770 |
| Wyoming Bentonite | 60 | 150 | | 1.004 |
| Calcine T | 60 | 175 | | .447 |
| Celite | 60 | 125 | | .379 |
| Micronized Red Slate | 60 | 150 | | 2.28 |
| PbO$_2$ | 60 | 200 | | .461 |

In molding the above products, I have found that it is desirable to employ a mold parting agent on the walls of the mold to facilitate removal of the molded product at the conclusion of the final heating step. I have used chrome plated sheets as the mold walls with zinc stearate as a mold lubricant. Cellulose acetate dissolved in acetone may be painted or mist sprayed on the walls in place of the stearate and used as the lubricant, but release of the product therefrom is not as good as with the stearate.

The time required for the mixture of high molecular weight siloxane, peroxide and filler to set up in the mold will depend upon the amount of peroxide added and upon the thickness of the mold section. In general, when the siloxane is the form of a gel, I prefer to use from 2 to 6 parts of peroxide. The time required for a section of about 1¼ inches under these conditions varies from ½ to 1 hour. As the temperature of molding is raised above 150° C., then setting is more rapid with consequent reduction in mechanical strength of product. The molded products which have been set by heating at 150° C. for ½ to 1 hour can be heated at 250° C. Further curing takes place and an improvement in mechanical properties of the final product results.

In general, the products obtained by the above process are extremely resistant to water, oil, high temperatures and low temperatures. A product containing 33% asbestos as a filler was found to lose only 4.4% weight after 22 hours at 250° C., and to have undergone no change at all in dimensions or in hardness. Another product containing 20% asbestos was held at 400–420° C. for six hours without disintegration. Even after 100 hours at 200° C. the products retained their compressibility. When immersed in water and oil for 85 hours they exhibited little or no swelling. They are far superior to ordinary rubber in their retention of properties at low temperature. A molded product which was prepared by an initial treatment of a dimethyl silicone of 8,500 c. s. viscosity with 2% by weight of benzoyl peroxide followed by milling with an equal weight of iron oxide and with 6% additional peroxide and molding at 140° C. was found to retain its flexibility and strength at −78° C., while an ordinary piece of rubber had become hard in the same time. Even after two hours at −78° C. the siloxane product was still flexible. The above properties admirably adapt the products of my invention to such uses as extreme temperature gaskets, washers, potting compounds for high temperature condensers, coverings for clamps exposed to extreme temperatures, flexible bags for high temperature moldings, insulated motor lead wires, ignition cables, etc. Their heat resistance and retention of mechanical properties, such as flexibility, compressibility, etc., make them unique in these fields of application.

Paints can also be prepared from organopolysiloxanes of the previously specified compositions by mixing varying amounts of fillers and 4 to 6 per cent of an aromatic acyl peroxide. The mixing is preferably accomplished by a 3-roll paint mill. The resulting mixture is then applied by spraying, roller coating or with brush. It is advisable to cure the paint film for ½ hour at 110° C. (when benzoyl peroxide is used) in the absence of oxygen, to obtain a tack-free firm coating. I have found that such curing may be carried out effectively in a $CO_2$ atmosphere or even under water. The resulting cured films are flexible and withstand being heated at 250° C. for over 250 hours without appreciable change in properties. These films when applied to metal also protect the surface of the metal against oxidation, even when heated to 250° C.

These molding compositions with or without fillers may also be applied to glass tape to form after 15 minutes at 125° C. a partially cured sticky electrical tape which may be wrapped around a metallic conductor and further cured at 125° C. in the absence of air for 45 minutes to a non-tacky rubbery insulating material. It should be pointed out here that these curing times are much shorter and the curing temperatures much lower than have hitherto been possible in utilizing organo-siloxanes as flexible insulating coatings. Ordinarily, to obtain a non-tacky flexible film of an organo-siloxane resin, it is necessary to cure the resin at a temperature of 200° C. or above, and for at least several hours. By the use of benzoyl peroxide and other aromatic acyl peroxides, the curing time has been considerably shortened and the curing temperature substantially reduced, thereby contributing greatly to the commercial development of the organo-siloxanes as electrically insulating materials, etc.

I claim:

1. The method which comprises mixing a liquid polymeric siloxane in which all organic radicals linked to the silicon atoms are methyl radicals and in which there is on the average between 1.75 and 2.25 methyl radicals per silicon atom and at least 40 mol per cent of the polymer units are dimethyl siloxane units with at least 1 per cent by weight of benzoyl peroxide, heating the mixture above 100° C. until it becomes a gel, milling said gel with a heat resistant filler and at least 2 per cent by weight of benzoyl peroxide based on the weight of the gel, and then heating the resulting composition above 100° C. in the substantial absence of oxygen until a coherent non-tacky rubbery product is obtained, the benzoyl peroxide employed in the process being up to a total of 8 per cent.

2. The method which comprises mixing a liquid dimethyl polysiloxane with at least 1 per cent by weight of benzoyl peroxide, heating the mixture above 100° C. until it becomes a gel mixing said gel with a polyvalent metal oxide and at least 2 per cent by weight of benzoyl peroxide based on the weight of the gel, and then heating the resulting composition above 100° C. in the substantial absence of oxygen until a coherent non-tacky rubbery product is obtained, the benzoyl peroxide employed in the process being up to a total of 8 per cent.

EARL LEATHEN WARRICK.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,392,713 | Wright et al. | Jan. 8, 1946 |
| 2,448,565 | Wright et al. | Sept. 7, 1948 |

FOREIGN PATENTS

| Number | Country | Date |
| --- | --- | --- |
| 113,708 | Australia | Sept. 4, 1941 |